United States Patent [19]

Kishi et al.

[11] Patent Number: 4,704,687
[45] Date of Patent: Nov. 3, 1987

[54] METHOD FOR CONSTRUCTIONING TOOL APPROACH AND RETRACTION PATHS FROM PRESET PATTERNS

[75] Inventors: Hajimu Kishi; Masaki Seki, both of Tokyo, Japan

[73] Assignee: Fanuc Ltd, Tokyo, Japan

[21] Appl. No.: 667,495

[22] PCT Filed: Feb. 14, 1984

[86] PCT No.: PCT/JP84/00045

§ 371 Date: Oct. 17, 1984

§ 102(e) Date: Oct. 17, 1984

[87] PCT Pub. No.: WO84/03244

PCT Pub. Date: Aug. 30, 1984

[30] Foreign Application Priority Data

Feb. 17, 1983 [JP] Japan .................................. 58-025187

[51] Int. Cl.$^4$ ..................... G05B 19/403; B23Q 15/00
[52] U.S. Cl. ..................................... 364/474; 364/171
[58] Field of Search .............................. 364/167–171, 364/474, 191, 192; 318/573, 568

[56] References Cited

U.S. PATENT DOCUMENTS

| | | | |
|---|---|---|---|
| 4,152,765 | 5/1979 | Weber | 364/191 |
| 4,328,550 | 5/1982 | Weber | 364/192 |
| 4,490,781 | 12/1984 | Kishi et al. | 364/191 |
| 4,503,493 | 5/1985 | Burkhardt | 318/573 |
| 4,519,026 | 5/1985 | Nozawa | 364/189 |
| 4,562,551 | 12/1985 | Inaba | 364/192 |

Primary Examiner—Jerry Smith
Assistant Examiner—Allen MacDonald
Attorney, Agent, or Firm—Staas & Halsey

[57] ABSTRACT

A three-dimensional tool path determination method for determining at least one path out of an approach path along which a tool 11 of a machine tool having three or more controlled axes is made to approach a workpiece, and a retraction path along which the tool 11 is retracted from the workpiece after machining is completed. The three-dimensional tool path determination method includes steps of designating a prescribed tool path pattern from among a plurality of tool path patterns, which prescribed tool path pattern includes an undecided portion (coordinate values of $P_1$, $P_2$), entering data specifying the undecided portion of the tool path pattern, which data includes at least a target position ($P_e$) and a distance ($d_1$), calculating the undecided portion by using the input data and an arithmetic expression that corresponds to the designated tool path pattern, and creating NC data specifying a three-dimensional tool path by using the obtained coordinate values of the points ($P_1$, $P_2$).

2 Claims, 10 Drawing Figures

METHOD FOR CONSTRUCTIONING TOOL APPROACH AND RETRACTION PATHS FROM PRESET PATTERNS

CROSS REFERENCE TO RELATED APPLICATIONS

The subject application is related to copending U.S. patent application having Ser. No. 665,165 filed Oct. 17, 1984.

BACKGROUND OF THE INVENTION

This invention relates to a three-dimensional tool path determination method and, more particularly, to a three-dimensional tool path determination method well-suited for application to an NC data creating apparatus for a machine tool, such as a milling machine, having three or more axes, or to a numerical control device for controlling the machine tool.

In a machine tool such as a milling machine, a tool is made to approach a workpiece from a predetermined position (e.g., a reference point), numerically controlled machining is executed by the tool in accordance with a command upon completion of the approach, and the tool is retracted to a predetermined position (e.g., the reference point) after machining. For this reason, NC data for approach and retraction are always required to precede and follow NC data for transporting the tool while the tool is in contact with the workpiece. There are various tool paths for the approach and retraction of the tool, with the optimum approach path or retraction path being determined in such a manner that the tool will not strike the machine or workpiece during the approach or retraction. These approach paths or retraction paths consist of a plurality of blocks.

Accordingly, in creating NC data for an approach path or NC data for a retraction path, the conventional method includes steps of (1) deciding a tool path comprising a plurality of blocks in such a manner that the tool does not strike the machine or workpiece, (2) deciding the end point of each block and the feedrate up to the end point, and (3) entering these end points and feedrates. Thus, creating the NC data for an approach path and the NC data for a retraction path is a troublesome and time-consuming operation.

SUMMARY OF THE INVENTION

Accordingly, an object of the present invention is to provide a three-dimensional tool path creation method through which the NC data for an approach path or tool retraction path can be created simply and in a short period of time.

Another object of the present invention is to provide a three-dimensional tool path creation method through which the NC data for an approach path or retraction path can be created automatically merely by specifying a prescribed tool path pattern among several tool path patterns, and entering data necessary for determining an unknown portion of the tool path pattern.

Still another object of the present invention is to provide a three-dimensional tool path creation method which does not require entry of the end point of each block constituting a tool path.

A further object of the present invention is to provide a three-dimensional tool path creation method through which an actual tool path can be determined and a tool transported along the tool path merely by specifying a prescribed tool path pattern among several tool path patterns, and entering data necessary for determining an unknown portion of the tool path pattern.

The present invention provides a three-dimensional tool path determination method for automatically determining a tool path by designating a tool path pattern for an approach path or retraction path, entering data specifying an unknown portion (parameter) of the tool path pattern, as well as path end point data, and using the input data and the tool path pattern. According to the present invention, a three-dimensional approach path or tool retraction path can be created simply and in a short period of time.

BRIEF DESCRIPTION OF THE DRAWINGS

FIG. 4 is a block diagram of an embodiment of the present invention; applied to an NC data creation apparatus, and FIGS. 5(A), 5(B) and 5(C) illustrate flowcharts of processing for the present invention.

DESCRIPTION OF THE PREFERRED EMBODIMENT

Figure 1A:
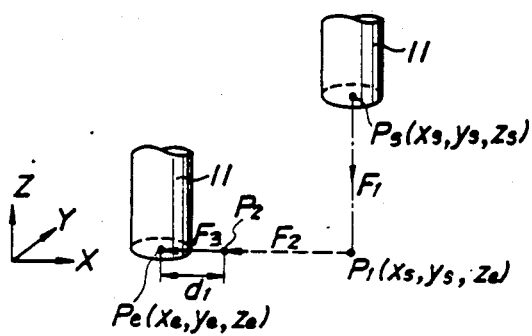
FIGS. 1(A), 1(B), 2(A), 2(B), 3(A) and 3(B) illustrate approach and retraction tool path patterns.
Figure 1B:
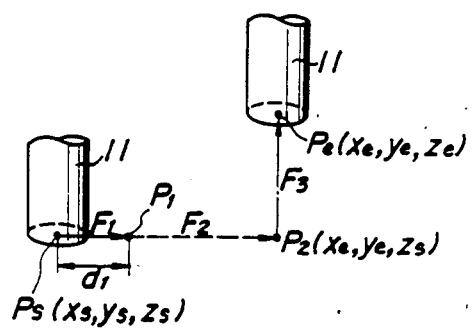
Figure 2A:
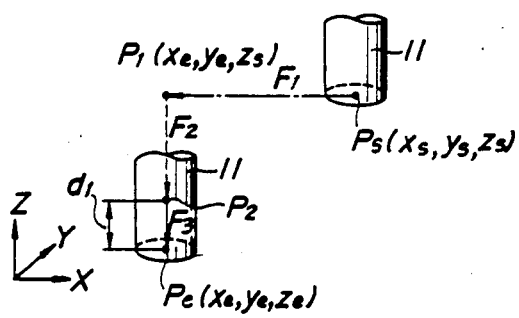
Figure 2B:
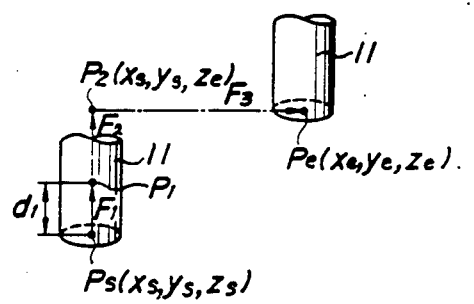
Figure 3A:
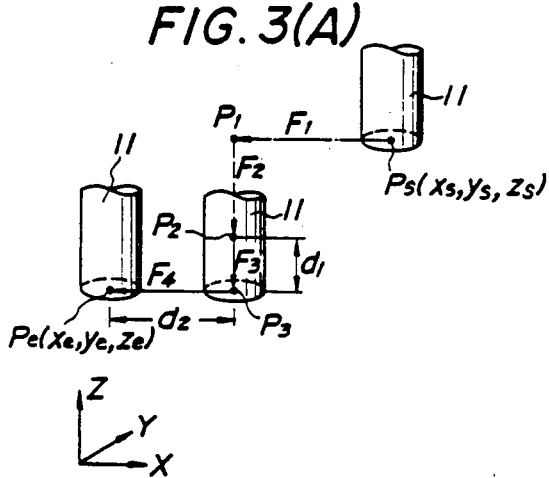

FIGS. 1 through 3 illustrate approach and retraction tool path patterns. In a machine tool such as a milling machine having three or more controlled axes, three tool paths patterns along which a tool may be made to approach a workpiece can be conceived, as shown in FIGS. 1(A), 2(A) and 3(A). The tool path pattern of FIG. 1(A) is an approach pattern for (a) moving a tool 11 to a point $P_1$ at a feedrate $F_1$ along the Z axis, (b) then moving the tool to a point $P_2$ at a feedrate $F_2$ along the X and Y axes simultaneously, and (c) finally moving the tool to a target position (end point) $P_e$ at a low rate $F_3$. The tool path pattern of FIG. 2(A) is an approach pattern for (a) moving the tool 11 from a current position $P_s$ to a point $P_1$, which is directly above a target position, at a feedrate $F_1$ by simultaneous two-axis control along the X and Y axes, (b) then moving the tool to a point $P_2$ at a feedrate $F_2$ along the Z axis, and (c) finally moving the tool to the target position (end point) $P_e$ at a low rate $F_3$. The tool path pattern of FIG. 3(A) is an approach pattern for (a) moving the tool 11 to a point $P_1$ at a feedrate $F_1$ by simultaneous two-axis control along the X and Y axes, (b) then moving the tool to a point $P_2$ at a feedrate $F_2$ along the Z axis, (c) subsequently moving the tool to a point $P_3$ at a feedrate $F_3$ along the Z axis, and (d) finally moving the tool to the target position (end point) $P_e$ at a feedrate $F_4$ by simultaneous two-axis control along the X and Y axes. Thus, if we take note of motion along the Z axis, the approach patterns can be classified into three categories, namely that of FIG. 1(A) showing an approach pattern in which movement along the Z axis is made first, that of FIG. 2(A) showing an approach pattern in which movement along the Z axis is made last, and that of FIG. 3(A) showing an approach pattern in which movement along the Z axis is made at an intermediate step.

Figure 3B:
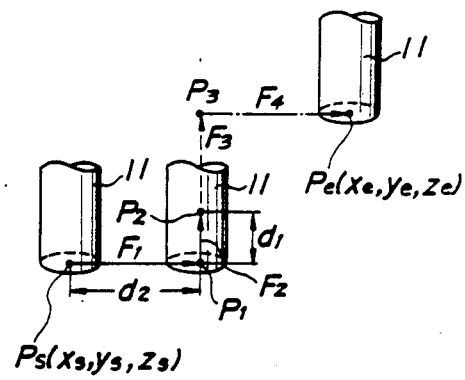

Likewise, three tool path patterns along which a tool may be retracted from a workpiece can be conceived, as shown in FIGS. 1(B), 2(B) and 3(B). The retraction patterns shown in FIGS. 1(B), 2(B) and 3(B) correspond to the approach patterns of FIGS. 1(A), 2(A) and 3(A), respectively, and are obtained by reversing the direction in which movement is made along the approach patterns. Thus, the tool path pattern of FIG. 1(B) is a retraction pattern for (a) moving the tool 11 from a current position $P_s$ to a point $P_1$ at a low rate $F_1$ by simultaneous two-axis control along the X and Y axes, (b) then moving the tool 11 to a point $P_2$ directly below a target position at a rate $F_2$ by simultaneous two-axis control along the X and Y axes, and (c) finally moving the tool to a target position (retraction point) $P_e$ at a rate $F_3$. The tool path pattern of FIG. 2(B) is a retraction pattern for (a) moving the tool 11 from a current position $P_s$ to a point $P_1$ at a low rate $F_1$ along the Z axis, (b) then moving the tool 11 to a point $P_2$ at a rate $F_2$ along the Z axis, and (c) finally moving the tool 11 to the target position Pe by simultaneous two-axis control along the X and Y axes. The tool path pattern of FIG. 3(B) is a retraction pattern for (a) moving the tool 11 to a point $P_1$ at a low rate $F_1$ by simultaneous two-axis control along the X and Y axes, (b) then moving the tool to a point $P_2$ at a rate $F_2$ along the Z axis, (c) subsequently moving the tool to a point P3 at a rate $F_3$ along the Z axis, and (d) finally moving the tool to the target position $P_e$ at a rate $F_4$ by simultaneous two-axis control along the X and Y axes. If we take note of motion along the Z axis, the retraction patterns can be classified into three categories, namely that of FIG. 1(B) showing a retraction pattern in which movement along the Z axis is made last, that of FIG. 2(B) showing a retraction pattern in which movement along the Z axis is made first, and that of FIG. 3(C) showing a retraction pattern in which movement along the Z axis is made at an intermediate step.

It should be noted that approach is indicated when the current position $P_s$ is above the target position $P_e$, and that retraction is indicated when the current position $P_s$ is below the target position $P_e$.

FIG. 4 is a block diagram of an embodiment of the three-dimensional path creation method of present invention as applied to a NC data creation apparatus; and FIG. 5 is a flowchart of processing for such NC data creation.

A pattern memory 101 stores various approach and retraction tool path patterns expressed as parameters. Specifically, the approach pattern shown in FIG. 1(A) is stored in the pattern memory 101 by being expressed in the following form:

$$\left. \begin{array}{l} Z\,Z_1\,F\,F_1; \\ X\,X_1\,Y\,Y_1\,F\,F_2; \\ X\,X_2\,Y\,Y_2\,F\,F_3; \end{array} \right\} \quad (A)$$

The retraction pattern shown in FIG. 1(B) is expressed as follows:

$$\left. \begin{array}{l} X\,X_1\,Y\,Y_1\,F\,F_1; \\ X\,X_2\,Y\,Y_2\,F\,F_2; \\ Z\,Z_1\,F\,F_3; \end{array} \right\} \quad (B)$$

The approach pattern shown in FIG. 2(A) is expressed as follows:

$$\left. \begin{array}{l} X\,X_1\,Y\,Y_1\,F\,F_1; \\ Z\,Z_1\,F\,F_2; \\ Z\,Z_2\,F\,F_3; \end{array} \right\} \quad (C)$$

The retraction pattern shown in FIG. 2(B) is expressed as follows:

$$\left. \begin{array}{l} Z\,Z_1\,F\,F_1; \\ Z\,Z_2\,F\,F_2; \\ X\,X_1\,Y\,Y_1\,F\,F_3; \end{array} \right\} \quad (D)$$

The approach and retraction patterns of FIGS. 3(A), (B) are each expressed as follows:

$$\left. \begin{array}{l} X\,X_1\,Y\,Y_1\,F\,F_1; \\ Z\,Z_1\,F\,F_2; \\ Z\,Z_2\,F\,F_3; \\ X\,X_2\,Y\,Y_2\,F\,F_4; \end{array} \right\} \quad (E)$$

Each of these patterns is stored in the pattern memory 101. The letters of the alphabet "X", "Y" and "Z" are address words indicating positions along the respective axes, the letter of the alphabet "F" is an address word indicating feedrate, and the letters of the alphabet having numerical suffixes are parameters.

When a data input/output unit 102 (a keyboard, display or the like) enters data specifying a prescribed pattern among the aforementioned patterns (A) through (E), as well as data specifying the parameters contained in the pattern, a processor 103 first stores the data in a storage area 105a of a working memory 105 in accordance with control specified by a control program stored in a ROM 104. The data specifying the aforementioned pattern and parameters are commanded in the following form for the approach and retraction shown in FIGS. 1(A), (B):

$$Xx_eYy_eZz_eT_1D_1d_1F_1f_1F_2f_2F_3f_3; \quad (F)$$

in the following form for the approach and retraction shown in FIGS. 2(A), (B):

$$Xx_eYy_eZz_eT_2D_1d_1F_1f_1F_2f_2F_3f_3; \quad (G)$$

and in the following form for the approach and retraction shown in FIGS. 3(A), (B):

$$Xx_eYy_eZz_eT_3D_1d_1D_2d_2F_1f_1F_2f_2F_3f_3F_4f_4; \quad (H)$$

wherein ($x_e$, $y_e$, $z_e$) are coordinate values of a target position (path end point), and the numerical value following the letter of the alphabet "T" indicates the type of path pattern, with the tool path pattern shown in FIGS. 1(A), (B) being designated by "$T_1$", the tool path pattern shown in FIGS. 2(A), (B) by "$T_2$", and the tool path pattern shown in FIGS. 3(A), (B) by "$T_3$". Further, the numerical values $d_1$, $d_2$ following "$D_1$", "$D_2$", respectively, represent the distances indicated by the same codes in FIGS. 1 through 3, and the numerical values $f_1$, $f_2$, $f_3$, $f_4$ following "$F_1$", "$F_2$", "$F_3$", "$F_4$", respectively, indicate the feedrates in the blocks assigned the codes $F_1$ through $F_4$ in FIGS. 1 through 4.

The processor 103 discriminates the numerical value following the letter of the alphabet "T" specifying the tool path pattern, and executes the following processing which depends upon whether a pattern is a first pattern (=$T_1$), a second pattern (=$T_2$) or a third pattern (=$T_3$).

Specifically, if the first pattern is designated, the co-ordinate value $z_s$ of the current position along the Z axis stored in a current position memory 106, and the coordinate value $z_e$ of the target position along the Z axis stored in the working memory 105 are compared in magnitude. If $z_s > z_e$ is found to hold, a decision is rendered to the effect that an approach path is to be created. If $z_s < z_e$ holds, then a decision in rendered to the effect that a retraction path is to be created. It should be noted that the coordinate values ($x_r$, $y_r$, $z_r$) of a reference point have already been entered by the data input/output unit 102 and stored in the current position memory 106. If we assume that the reference point coincides with the point $P_s$ shown in FIGS. 1(A), 2(A) and 3(A), then $x_s = x_r$, $y_s = y_r$, $z_s = z_r$ will hold.

If $z_s > z_e$ (approach) holds, the coordinates of points $P_1$, $P_2$ shown in FIG. 1(A) are calculated. The coordinate values of points $P_1$, $P_2$ in FIG. 1(A) are as follows:

Coordinate values of point $P_1$: $x_s$, $y_s$, $z_e$
Coordinate values of point $P_2$: ($x_e - l_x$), ($y_e - l_y$), $z_e$
wherein the following hold:

$$l_x = d_1 \cdot (x_e - x_s)/\sqrt{(x_e - x_s)^2 + (y_e - y_s)^2} \quad (1)$$

$$l_y = d_1 \cdot (y_e - y_s)/\sqrt{(x_e - x_s)^2 + (y_e - y_s)^2} \quad (2)$$

Thereafter, the parameters $Z_1$, $X_1$, $X_2$, $Y_1$, $Y_2$ of the approach pattern shown in FIG. 1(A) [see pattern (A)] are found from the following equations and stored in a data storage area 105b of the working memory:

$$\left.\begin{array}{l} Z_1 = z_e \\ X_1 = (x_e - l_x) \\ Y_1 = (y_e - l_y) \\ X_2 = x_e \\ Y_2 = y_e \end{array}\right\} \quad (3)$$

Next, the approach pattern (A) is read out of the pattern memory 101, the pattern is stored in a pattern storage area 105c of the working memory 105, and the parameters $Z_1$, $X_1$, $X_2$, $Y_1$, $Y_2$ of the pattern (A) are replaced with the numerical values of Eqs. (3) to create the following NC data for the approach path:

$$\left.\begin{array}{l} Z\ z_e\ F f_1; \\ X (x_e - l_x)\ Y(y_e - l_y)\ F f_2; \\ X x_e\ Y y_e\ F f_3; \end{array}\right\} \quad (I)$$

this data is stored in a RAM 107. In this way NC data specifying the approach pattern of FIG. 1(A) are created. Processing ends when the contents of the current position memory 106 are updated to the target position ($x_e$, $y_e$, $z_e$).

If $z_s < z_e$ (retraction) holds when the first pattern is designated, the coordinate values of points $P_1$, $P_2$ shown in FIG. 1(B) are found. The coordinate values of the points $P_1$, $P_2$ are expressed as follows:

Coordinate values of point $P_1$: ($x_s + l_x$), ($y_s + l_y$), $z_s$
Coordinate values of point $P_2$: $x_e$, $y_e$, $z_s$
wherein $l_x$, $l_y$ are obtained from Eqs. (1), (2).

Thereafter, the parameters $X_1$, $X_2$, $Y_1$, $Y_2$, $Z_1$ of the retraction pattern (B) are found from the following equations and stored in the data storage area 105b of the working memory 105:

$$\left.\begin{array}{l} X_1 = x_s + l_x \\ Y_1 = y_s + l_y \\ X_2 = x_e \\ Y_2 = y_e \\ Z_1 = z_e \end{array}\right\} \quad (4)$$

Next, the approach pattern (B) is read out of the pattern memory 101, the pattern is stored in the pattern storage area 105c of the working memory 105, and the parameters $X_1$, $X_2$, $Y_1$, $Y_2$, $Z_1$ of the pattern are replaced with the numerical values calculated in accordance with Eqs. (4) to create the following NC data:

$$\left.\begin{array}{l} X (x_s + l_x)\ Y(y_s + l_y)\ F f_1; \\ X x_e\ Y y_e\ F f_2; \\ Z z_e\ F f_3; \end{array}\right\} \quad (J)$$

This data is stored in the RAM 107. Through the foregoing processing NC data specifying the retraction pattern of FIG. 1(B) is created. Processing ends when the contents of the current position memory 106 is updated. In accordance with the above-described method, NC data for the approach path is created first, followed by the creation of the NC data for the machining path, and finally by the creation of NC data for the retraction path.

The foregoing relates to a case where data indicated in the first pattern (F) is entered by the data input/output unit 102. If data identifying the second pattern (G) is entered, the processor 103 compares, in magnitude, the coordinate value $z_s$ of the current position along the Z axis stored in the current position memory 106, and the coordinate value $z_e$ of the target position along the Z axis stored in the working memory 104. If $z_s > z_e$ is found to hold, a decision is rendered to the effect that an approach path is to be created. If $z_s < z_e$ holds, then a decision in rendered to the effect that a retraction path is to be created.

If $z_e > z_e$ holds, the coordinates of points $P_1$, $P_2$ shown in FIG. 2(A) are calculated. The coordinate values of points $P_1$, $P_2$ in FIG. 2(A) are as follows:

Coordinate values of point $P_1$: $x_e$, $y_e$, $z_s$
Coordinate values of point $P_2$: $x_e$, $y_e$, ($z_e + d_1$)

Thereafter, the processor 103 finds the parameters $X_1$, $Y_1$, $Z_1$, $Z_2$ of the approach pattern of FIG. 2(A) from the following equations, and stores the parameters in the data storage area 105b of the working memory 105:

$$\left.\begin{array}{l} X_1 = x_e \\ Y_1 = y_e \\ Z_1 = z_e + d_1 \\ Z_2 = z_e \end{array}\right\} \quad (5)$$

Next, the processor 103 reads the approach pattern (C) out of the pattern memory 101, stores the pattern in the pattern storage area 105c of the working memory 105, and replaces the parameters $X_1$, $Y_1$, $Z_1$, $Z_2$ of the approach pattern (C) with the numerical values of Eqs. (5) to create the following NC data for the approach path:

$$\left. \begin{array}{l} X\,x_e\,Y\,y_e\,F\,f_1; \\ Z\,(z_e + d_1)\,F\,f_2; \\ Z\,z_e\,F\,f_3; \end{array} \right\} \quad (K)$$

This data is stored in the RAM 107. This is followed by performing processing similar to that described above to end the NC data creation processing for the approach path.

If $z_s < z_e$ is found to hold when the data of the second pattern (G) are entered, the coordinate values of the points $P_1$, $P_2$ shown in FIG. 2(B) are found. The coordinate values of points $P_1$, $P_2$ in FIG. 2(B) are as follows:

Coordinate values of point $P_1$: $x_s$, $y_s$, $(z_s+d_1)$
Coordinate values of point $P_2$: $x_s$, $y_s$, $z_e$ Thereafter, the processor finds the parameters $X_1$, $Y_1$, $Z_1$, $Z_2$ of the retraction pattern (D) from the following equations, and stores the parameters in the data storage area 105b of the working memory 105:

$$\left. \begin{array}{l} Z_1 = z_s + d_1 \\ Z_2 = z_e \\ X_1 = x_e \\ Y_1 = y_e \end{array} \right\} \quad (6)$$

Next, the processor 103 reads the retraction pattern (D) out of the pattern memory 101, stores the pattern in the pattern storage area 105c of the working memory 105, and replaces the parameters $X_1$, $Y_1$, $Z_1$, $Z_2$ of the pattern with the numerical values of Eqs. (6) to create the following NC data:

$$\left. \begin{array}{l} Z\,(z_s + d_1)\,F\,f_1; \\ Z\,z_e\,F\,f_2; \\ X\,x_e\,Y\,y_e\,F\,f_3; \end{array} \right\} \quad (L)$$

This data is stored in the RAM 107. This is followed by performing processing similar to that described above to end the NC data creation processing for the retraction path.

On the other hand, where data indicated in the third pattern (H) is entered by the data input/output unit 102, the processor 103 compares $z_s$ and $z_e$ in magnitude. If $z_s > z_e$ is found to hold, a decision is rendered to the effect that NC data for an approach path is to be created. If $z_s < z_e$ holds, then a decision in rendered to the effect that NC data for a retraction path is to be created.

If $z_s > z_e$ holds, the coordinate values of points $P_1$, $P_2$, $P_3$ shown in FIG. 3(A) are calculated. The coordinate values of points $P_1$, $P_2$, $P_3$ are as follows:

Coordinate values of point $P_1$: $x_e - l_x$, $y_e - l_y$, $x_s$
Coordinate values of point $P_2$: $x_e - l_x$, $y_e - l_y$, $z_e d_1$
Coordinate values of point $P_3$: $x_e - l_x$, $y_e - l_y$, $z_e$
wherein the following hold:

$$l_x = d_2 \cdot (x_e - x_s) / \sqrt{(x_e - x_s)^2 + (y_e - y_s)^2} \quad (7)$$

$$l_y = d_2 \cdot (y_e - y_s) / \sqrt{(x_e - x_s)^2 + (y_e - y_s)^2} \quad (8)$$

Thereafter, the parameters $X_1$, $X_2$, $Y_1$, $Y_2$, $Z_1$, $Z_2$ of the approach pattern shown in FIG. 3(A) are found from the following equations and stored in the data storage area 105b of the working memory 105:

$$\left. \begin{array}{l} X_1 = x_e - l_x \\ Y_1 = y_e - l_y \\ Z_1 = (z_e + d_1) \\ X_2 = x_e \\ Y_2 = y_e \\ Z_2 = z_e \end{array} \right\} \quad (9)$$

Next, the processor 103 reads approach pattern (E) out of the pattern memory 101, stores the pattern in the pattern storage area 105c of the working memory 105, and replaces the parameters $X_1$, $Y_1$, $Z_1$, $Z_2$, $X_2$, $Y_2$ of the pattern (E) with the numerical values of Eqs. (9) to create the following NC data for the approach path:

$$\left. \begin{array}{l} X\,(x_e - l_x)\,Y\,(y_e - l_y)\,F\,f_1; \\ Z\,(z_e + d_1)\,F\,f_2; \\ Z\,z_e\,F\,f_3; \\ X\,x_e\,Y\,y_e\,F\,f_4; \end{array} \right\} \quad (M)$$

This data is stored in the RAM 107. This is followed by performing processing similar to that described above to end the NC data creation processing for the approach path.

If $z_s < z_e$ is found to hold when the third pattern (H) is designated, the coordinate values of the points $P_1$, $P_2$, $P_3$ shown in FIG. 3(B) are found. The coordinate values of points $P_1$, $P_2$, $P_3$ are expressed as follows:

Coordinate values of point $P_1$: $x_s+l_x$, $y_s+l_y$, $z_s$
Coordinate values of point $P_2$: $x_s+l_x$, $y_s+l_y$, $z_s+d_1$
Coordinate values of point $P_3$: $x_s+l_x$, $y_s+l_y$, $z_e$
wherein $l_x$, $l_y$ are obtained from Eqs. (7), (8).

Thereafter, the processor finds the parameters $X_1$, $X_2$, $Y_1$, $Y_2$, $Z_1$, $Z_2$ of the retraction pattern (E) from the following equations, and stores the parameters in the data storage area 105b of the working memory 105:

$$\left. \begin{array}{l} X_1 = x_s + l_x \\ Y_1 = y_s + l_y \\ Z_1 = z_s + d_1 \\ X_2 = x_e \\ Y_2 = y_e \\ Z_2 = z_e \end{array} \right\} \quad (10)$$

Next, the processor 103 reads the retraction pattern (E) out of the pattern memory 101, stores the pattern in the pattern storage area 105c of the working memory 105, and replaces the parameters $X_1$, $Y_1$, $Z_1$, $Z_2$, $X_2$, $Y_2$ of the pattern (E) with the numerical values of Eqs. (10) to create the following NC data for the retraction path:

$$\left.\begin{array}{l} X(x_s + l_x) \, Y(y_s + l_y) \, F f_1; \\ Z(z_s + d_1) \, F f_2; \\ Z \, z_e \, F f_3; \\ X \, x_e \, Y \, y_e \, F f_4; \end{array}\right\} \quad (N)$$

This data is stored in the RAM 107. This is followed by performing processing similar to that described above to end the NC data creation processing for the retraction path.

In the foregoing description, approach and retraction were distinguished between based on the Z-axis coordinate values of the current position and target position, without entering data indicating the distinction between approach and retraction. However, an arrangement can be adopted in which the distinction between approach and retraction is entered as an input. Furthermore, while the foregoing relates to a case where the invention is applied to an NC data creation apparatus, the invention is also applicable to an NC apparatus. By way of example, an arrangement is possible in which the pattern data indicated by (F) and (G) is entered as approach or retraction NC data, NC data indicated by (I) through (N) is created within the NC apparatus, and numerical control is performed using the NC data.

According to the present invention, approach and retraction tool path patterns are stored in a memory, a prescribed tool path pattern is designated, data for specifying the parameters of the tool path pattern are entered, and a tool path is determined by using the entered data and tool path pattern. NC data for an approach or retraction tool path can therefore be created simply and in a short period of time. Accordingly, the present invention is well-suited for application to an NC data creation apparatus and an NC apparatus.

We claim:

1. A three-dimensional tool path determination method, for an apparatus having a memory, for determining at least one tool path out of an approach tool path along which a tool of a machine tool having three or more controlled axes is made to approach a workpiece, and a retraction tool path along which the tool is retracted from the workpiece after machining is completed, said method having the steps of:
   (a) entering data into the memory defining a plurality of tool path patterns, each having a target position;
   (b) designating one of said tool path patterns, said designated tool path pattern having a variable portion;
   (c) entering data into the memory specifying said variable portion of said designated tool path pattern;
   (d) monitoring a current position of the tool;
   (e) comparing the current position with the target position contained in said data specifying said variable portion;
   (f) determining an approach path using the designated tool path pattern and the data specifying said variable portion in a case where the current position is located above the target position; and
   (g) determining a retraction tool path using the designated tool path pattern and the data specifying said variable portion in a case where the current position is located below the target position.

2. A three-dimensional tool path determination method according to claim 1, wherein said variable portion includes end point coordinate values, and said method further comprises a step of creating NC data by using the end point coordinate values.

* * * * *

UNITED STATES PATENT AND TRADEMARK OFFICE
CERTIFICATE OF CORRECTION

PATENT NO. : 4,704,687

DATED : Nov. 3, 1987

INVENTOR(S) : Kishi et al.

Page 1 of 2

It is certified that error appears in the above-identified patent and that said Letters Patent is hereby corrected as shown below:

Col. 2, line 18, "invention;" s/b --invention--;
line 19, "ratus," s/b --ratus;--.

Col. 3, line 41, after "of" insert --the--;
line 55, "$XX_2\ YY_2$" s/b --$XX_1\ YY_1$--.

Col. 5, line 14, "in" s/b --is--;
line 26, "1" (both occurrences) s/b --l--;
line 30, "$1_x$" s/b --$l_x$--;

line 33, "$1_y$" s/b --$l_y$--;

line 42, "$1_x$" s/b --$l_x$--;

line 43, "$1_y$" s/b --$l_y$--;

line 56, "1" (both occurrences) s/b --l--;
line 60, "this" s/b --This--.

Col. 6, line 1, "1" (both occurrences) s/b --l--;
line 3, "1" (both occurrences) s/b --l--;
line 10, "$1_x$" s/b --$l_x$--;

line 11, "$1_y$" s/b --$l_y$--;

line 25, "1" (both occurrences) s/b --l--;
line 49, "in" s/b --is--;
line 51, "$Z_e$" (first occurrence) s/b --$Z_s$--.

Col. 7, line 59, "in" s/b --is--;
line 64, "1" (both occurrences) s/b --l--;
line 65, "1" (both occurrences) s/b --l--;

UNITED STATES PATENT AND TRADEMARK OFFICE
CERTIFICATE OF CORRECTION

PATENT NO. : 4,704,687

DATED : Nov. 3, 1987

INVENTOR(S) : Kishi et al.

It is certified that error appears in the above-identified patent and that said Letters Patent is hereby corrected as shown below:

line 65, after "$Z_e$" insert -- + --;

line 66, "1" (both occurrences) s/b --l--;

Col. 8, line 3, "$1_x$" s/b --$l_x$--;

line 6, "1" s/b --l--;
        line 14, "$1_x$" s/b --$l_x$--;

line 15, "$1_y$" s/b --$l_y$";

line 30, "1" (both occurrences) s/b --l--;
        line 44, "1" (both occurrences) s/b --l--;
        line 45, "1" (both occurrences) s/b --l--;
        line 46, "1" (both occurrences) s/b --l--;
        line 54, "1" s/b --l--;
        line 55, "1" s/b --l--.

Col. 9, line 3, "1" (both occurrences) s/b --l--.

Signed and Sealed this

Thirty-first Day of May, 1988

*Attest:*

DONALD J. QUIGG

*Attesting Officer*        *Commissioner of Patents and Trademarks*